UNITED STATES PATENT OFFICE.

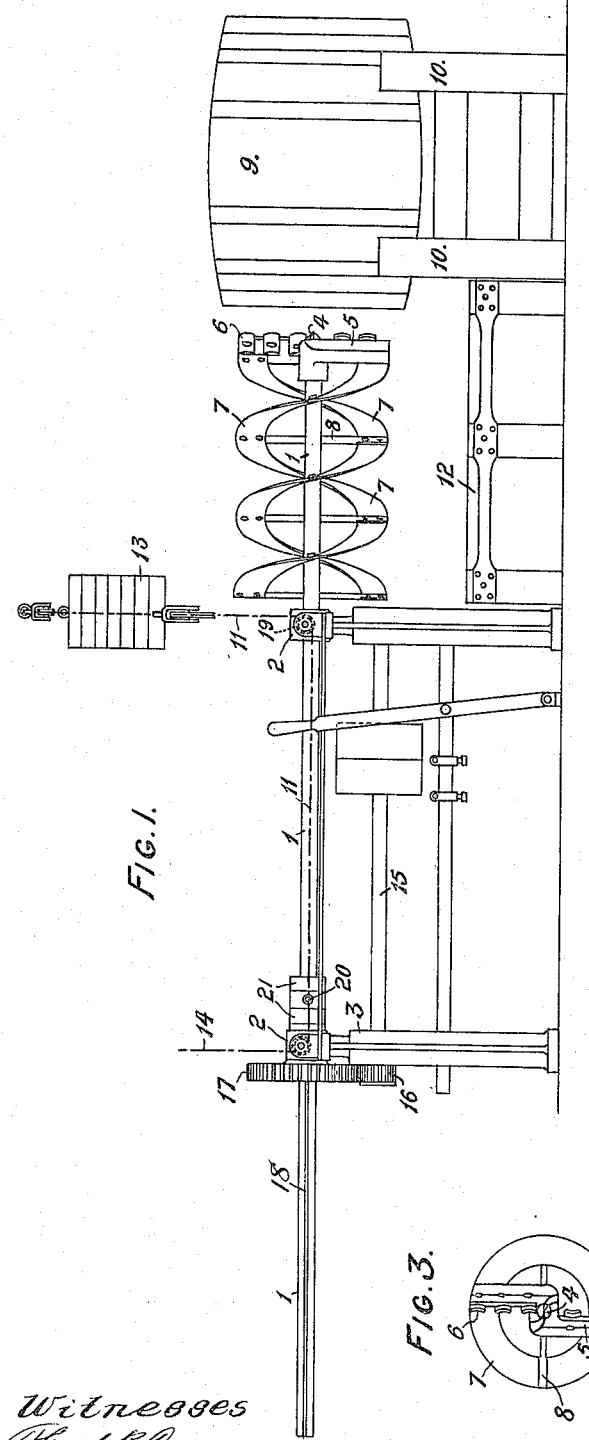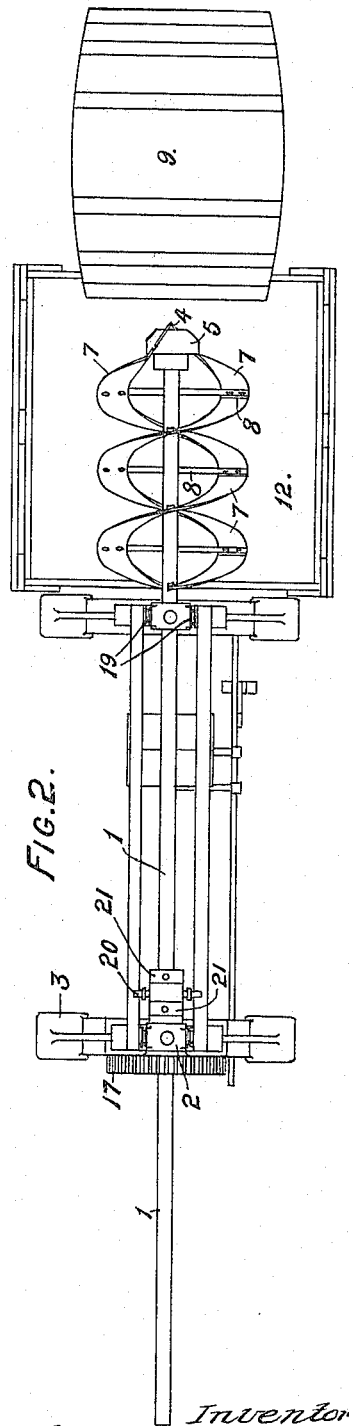

GEORGE SHORTEN, OF GREAT CROSBY, NEAR LIVERPOOL, ENGLAND.

MACHINE FOR EMPTYING BARRELS.

1,145,927.   Specification of Letters Patent.   Patented July 13, 1915.

Application filed May 29, 1914. Serial No. 841,905.

*To all whom it may concern:*

Be it known that I, GEORGE SHORTEN, a subject of the King of England, residing at 24 Crooks Lane, Great Crosby, near Liverpool, in the county of Lancaster, England, have invented new and useful Improvements in Machines for Emptying Barrels, of which the following is a specification.

This invention relates to a machine or appliance for extracting hard fats or other hard, plastic or semi hard substances from casks or the like mechanically and in a continuous manner, and thus effect a saving in the time and labor entailed in digging the substance out with a spade, or the disadvantages resulting from melting out the contents of the cask by the introduction thereinto of live steam.

Hitherto it has been proposed to extract substances mechanically by a set of mechanically actuated rotary cutters, which are caused to ascend by hydraulic means into the inverted barrel clamped over an opening in an elevated platform, while another proposal was to first raise the barrel open end downward, and then lower it on to a device containing one or more cutters, rotary motion being imparted either to the barrel or to the cutters as the barrel descends, or the cutters had an upward movement imparted to them and the barrel the rotary motion. Both these arrangements involve a barrel being placed open end downward, also both arrangements necessitate the barrel being elevated to a higher level than the extracting apparatus before such apparatus would operate on the contents.

Now the object of my invention is to provide an improved and more compact machine, and one which does not necessitate placing the barrel in an inverted position open end downward, or the raising of the barrel above the extracting apparatus.

According to my invention, I provide a stand on which the cask or like receptacle is laid on its bilge in a substantially horizontal position, and I journal in suitable bearings in a frame, a shaft located in line with the axis of the cask and mechanically rotated by suitable gear, also capable of movement in a longitudinal direction. The end of the shaft has a center point, and extending radially therefrom are arms which carry suitable cutting blades in front, while extending rearwardly from these arms is a flat blade or blades twisted into spirals and spaced around but some distance from the center shaft and secured thereto. The diameter of the spiral blade or blades, and the collective length of the arms is a little less than the internal diameter of the cask, and when the point of the shaft is pushed into the fatty substance in the cask, and rotated, the cutters cut out the fatty substance in shavings, while the matter cut off is withdrawn continuously by the spiral blade or blades.

In the accompanying drawings Figure 1 is a side elevation of my apparatus for extracting hard fats and other hard or fatty substances from barrels and casks; Fig. 2 is a plan view thereof; and Fig. 3 is a front view of the cutting tool.

Referring to these figures, 1 is the mechanically rotating shaft journaled in bearings 2 in the frame 3, so as to be capable of longitudinal movement as well as a rotary motion.

4 is the center point at the end of the shaft, 5 the arms mounted on the shaft in front and extending radially therefrom in opposite directions, and 6 the cutting blades secured to the arms in an inclined cutting position, and projecting a little in advance of the arms.

7 are the two blades each twisted into a spiral and passed around the center shaft 1 and secured thereto by being at the front ends fastened to the arms 5 and at intervals to rods 8.

9 is an example of a cask or barrel laid on its bilge in a suitable stand 10, and secured thereto so as to lie in line with the shaft 1. The diameter of the spiral blade or blades and the collective length of the arms 5 is a little less than the internal diameter of the cask.

The cutters 6 are located at intervals along the length of the arms 5 from the center toward the ends, those on one arm alternating with those on the other arm. These arms 5 may be adjustable if desired so as to vary their radial sweep in boring, and so describe the diameter required for boring out the fat. The cutters are fed up to their work by moving the shaft 1 longitudinally, such as by the pull of a weighted cord 11 passing under pulleys 19, at the same time rotating the shaft 1 and the shavings of fat are ejected or dumped into a suitable tray 12 located at the end of the stand below the shaft carrying the spiral blades into which tray the shavings of fat or other extracted substance, are ejected or dumped direct, or such shavings may be ejected direct into the melting vats by the spiral blades. The weight for the cord 11 is shown at 13, and the other end of the cord is secured to the studs 20 projecting from a loose collar which is mounted freely on the shaft 1 between collars 21 which are fixed to the shaft. The studs are prevented from rotating with the shaft by the horizontal members of the frame 3.

In operation a cask or barrel containing the fatty or other substance is laid on its bilge in a suitable holder or stand and secured thereto, so as to lie in line with the shaft 1. The shaft is then operated, so that the point 4 at the end penetrates the fat, and the cutters 6 continuously shave off the fat from the interior of the barrel, which fat is discharged by the rotating spirals 7, no withdrawal of the tool being necessary until the bottom of the cask is reached. The diameter of the spirals 7 and the length of the cutter arms 5 is the measure of the capacity of the machine for extracting the fat, et cetera, from the interior of the cask, and the spirals 7 being hollow give great freedom of discharge for the parings or slices. When the tool has bored its way through the fat to the bottom of the cask a reverse longitudinal movement of the shaft 1 withdraws the tool from the cask, this reverse movement being effected if desired by transferring the weight 13 to the other cord 14, so as to pull the shaft back longitudinally, or by simply pulling the cord 14 by hand. The cask is then removed from its stand, and any fat still remaining in the cask scraped off by hand. Except for this final operation, the extraction of the fat from the cask is done automatically without hand manipulation, and furthermore the fat is extracted in thin parings or slices instead of in large lumps as is the case when a spade is used, and so is capable of being melted in pans or vats in a much shorter time than if extracted in large lumps. The cutters 6 may have crescent shaped cutting edges, the latter projecting somewhat in advance of the arms 5 to which they are affixed.

There are various ways of driving the shaft 1, and I do not of course confine myself to any given arrangement. For instance, the shaft may be driven from a countershaft 15 by toothed gear wheels 16, 17, the gear wheel 17 on the main shaft 1 being secured thereto by a feather in the eye of the wheel fitting in a groove 18 in the shaft 1, so that while imparting rotation to the shaft 1, allows of the latter's longitudinal movement in either direction by the weighted cords or otherwise.

What is claimed is:—

1. A barrel emptying machine comprising a barrel support, a rotatable horizontally movable shaft, a cutter head on the shaft having a cutting sweep slightly less than the inside diameter of a barrel, and a spiral conveyer equal in diameter to the cutting sweep of the cutter head.

2. A barrel emptying machine comprising a barrel support, a rotatable horizontally movable shaft, a cutter head on the shaft having a cutting sweep slightly less than the inside diameter of a barrel, a relatively long spiral conveyer on the shaft, the diameter of the conveyer being equal to the cutting sweep of the cutter head whereby the interior of the barrel may be scraped by the conveyer, and means for moving the cutter head and conveyer in and out of the barrel.

3. A machine for emptying barrels, comprising a frame, a shaft mounted on the frame, a cutter head fixed on the end of the shaft, said cutter head comprising a plurality of radial arms, and a plurality of cutter blades mounted on the arms, said cutter blades being mounted at an acute angle to the plane of rotation of the cutter head, and a spiral conveyer mounted on the shaft, a barrel support, means for rotating the shaft, and means for moving the shaft longitudinally.

4. A machine for emptying barrels, comprising a frame, a support for holding a barrel upon its bilge, a shaft mounted in the frame, a plurality of arms on the end of the shaft forming a cutter head, a conveyer mounted on the shaft, said conveyer comprising a plurality of strips twisted spirally around the shaft and having one of their ends connected to the arms of the cutter head, and their other ends connected to radial supports mounted on the shaft, and means for moving the shaft and cutter head into the barrel.

5. A machine for emptying barrels, comprising a frame, a barrel support, a main shaft mounted in bearings in the frame, a cutter head and conveyer mounted on the end of the shaft, and a relatively long keyway cut in the shaft, a power shaft mounted in the frame, a gear on said shaft, said gear meshing with a gear on the main shaft, the last mentioned gear having a key which engages the keyway in the main shaft, means for applying power to the power shaft, and means for sliding the main shaft forward while the said main shaft is in motion.

6. A machine for emptying barrels, comprising a frame, a longitudinally movable shaft mounted in the frame, a cutter head and conveyer mounted on the end of the shaft, a barrel support for supporting a barrel so that the axis of the barrel coincides with the axis of the said shaft, the cutting sweep of the cutter head being slightly less in diameter than the diameter of the barrel opening, means for rotating the shaft, and means for automatically moving the shaft and cutter head into the barrel as the contents thereof are cut out.

7. A machine for emptying barrels comprising a frame, a shaft mounted in the bearings in the frame, a support for supporting a barrel in alinement with the shaft, means for rotating the shaft, a loose collar on the shaft, a collar fixed to the shaft on either side of the loose collar, diametrically opposed pins on the periphery of the loose collar, side bars mounted on the frame for engagement with the said pins whereby the loose collar is held from rotation, a pulley mounted on the frame and a weighted cord which passes around the pulley and is connected to the pins on the said loose collar, whereby the shaft may be slid longitudinally into the barrel to remove the contents thereof, and means for withdrawing the shaft and cutter head from the barrel.

In testimony whereof I have signed my name to this specification in the presence of two subscribing witnesses.

GEORGE SHORTEN.

Witnesses:
 SOMERVILLE GOODALL,
 WM. J. HUMPHREYS.

Copies of this patent may be obtained for five cents each, by addressing the "Commissioner of Patents, Washington, D. C."